United States Patent [19]

Blucher et al.

[11] Patent Number: 4,581,871
[45] Date of Patent: Apr. 15, 1986

[54] FASTENER AND NOSEPIECE FOR INSTALLING LATH

[75] Inventors: William J. Blucher, Addison; Elbert E. Williams, Jr., Hoffman Estates; Francis C. Peterson, St. Charles; Richard J. Ernst, Palatine, all of Ill.

[73] Assignee: Illinois Tool Works Inc., Chicago, Ill.

[21] Appl. No.: 571,303

[22] Filed: Jan. 16, 1984

[51] Int. Cl.⁴ .................... F16B 25/02; F16B 37/12; F16B 43/02; E04C 5/16

[52] U.S. Cl. ........................ 52/681; 52/454; 411/387; 411/438; 411/547

[58] Field of Search ............... 52/361, 362, 363, 454, 52/679, 681, 682; 411/250, 251, 262, 153, 352, 386, 387, 392, 396, 397, 399, 438, 533, 543, 544, 546, 547

[56] References Cited

U.S. PATENT DOCUMENTS

| 1,264,677 | 4/1918 | Murrell | 411/438 |
| 1,546,522 | 7/1925 | Voight | 52/681 X |
| 1,640,303 | 8/1927 | Voight | |
| 1,701,095 | 2/1929 | Benedict | 52/681 |
| 1,703,557 | 2/1929 | Sullivan | |
| 2,575,731 | 11/1951 | Santa | 411/438 X |
| 3,376,683 | 4/1968 | Epstein | 52/681 X |
| 4,309,135 | 1/1982 | Gutshall | 411/262 X |
| 4,437,784 | 3/1984 | Peterson | 411/547 |

FOREIGN PATENT DOCUMENTS

| 3037606 | 4/1982 | Fed. Rep. of Germany | 411/546 |
| 559320 | 2/1975 | Switzerland | 411/438 |
| 646671 | 11/1950 | United Kingdom | 411/438 |

Primary Examiner—Thomas J. Holko
Attorney, Agent, or Firm—David I. Roche; Thomas W. Buckman

[57] ABSTRACT

A fastener and a nosepiece for use in attaching lath to a support. The fastener includes a screw and a spacing element, in which the spacing element is adapted to threadingly penetrate the lath and abut the support. The lath is retained between the spacing element and the head of the screw and is thereby held away from the support in order to allow plaster to properly extrude through openings in the lath. The nosepiece is attachable to a driving tool and has rigid prongs which reach through openings in the lath. Travel of a bit on the driving tool is limited so that automatic disengagement occurs to prevent over-driving of the screw. The prongs ensure that the lath is held a predetermined distance from the support.

5 Claims, 8 Drawing Figures

FASTENER AND NOSEPIECE FOR INSTALLING LATH

BACKGROUND AND SUMMARY OF THE INVENTION

This invention relates to the attachment of lath to a support. In particular, the invention involves the use of a screw and a spacing element to leave a space between the lath and the support. The invention is directed to the fastener as well as a tool specially designed to install the fastener.

Current techniques for attaching lath have been found to be quite unsatisfactory. Installers of lath frequently use scrap material as a shim between the lath and the support, and then apply standard screws to hold the lath against the shim. With this technique, it is frequently the case that a workman will not provide a space between the lath and its support, because scrap material may not be available, or because it may be difficult to hold a shim in place while installing a piece of lath of significant lateral extent. It should be noted that architects and building codes frequently require that a space be provided between lath and a support. The spacing is important because it provides a place for plaster to extrude when it is applied to the lath. Without proper spacing at locations where the lath is supported, the thickness of the plaster will not be sufficient, and unsightly cracking will be much more likely to occur.

It is, therefore, an object of the present invention to provide a fastener for attaching lath to a support.

Another object of the invention is to provide a tool for installing fasteners in accordance with the present invention.

Another object of the invention is to provide a fastener which will enable the attachment of lath to a variety of supports including supports of both metallic and non-metallic materials.

Another object of the invention is to provide a spacing element for use with a screw to attach lath to a support.

Another object of the invention is to provide a unitary screw-like fastener which can be used to spacingly attach lath to a support.

These and other objects and advantages of the invention are achieved by using a screw with a head at one end and a tip at the other. A spacing element associated with the screw is generally helically shaped and is adapted to threadingly engage the lath and lift the lath away from the support. The spacing element may be separate from the screw, preassembled to the tip of the screw, or integrally formed along the shank of the screw. The spacing element, however, preferably includes a tapering helix in order to facilitate engagement of the spacing element with the lath. The invention also involves the use of a special tool which includes a generally tubular element which is attachable to a driving tool. The tubular portion includes at least one prong-like element extending axially from the free end thereof. In the preferred embodiment of the fastener of the present invention, a spacing element comprised of a helical coil is preassembled to the screw at a location adjacent to the tip of the screw. The screw preferably includes a drill tip. As the screw is used to drill a hole in the support, the spacing element makes its way through the lath and abuts the support. The screw penetrates both the support and the spacing element. When proper penetration of the screw into the support has taken place, continued axial advancement of the screw is stopped, and the lath is held between the head of the screw and upper portions of the spacing element. The tool is adapted to automatically disengage from the head of the screw at a predetermined point.

DETAILED DESCRIPTION OF THE DRAWINGS

Figures 7, 8:
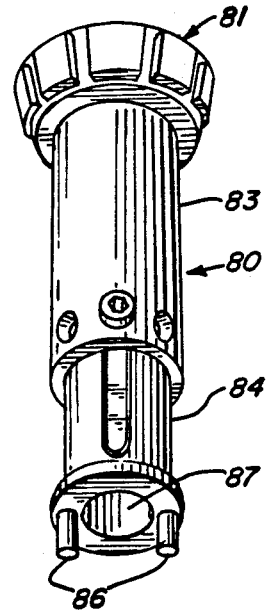
FIG. 7 is a perspective view of a nosepiece of the present invention.

FIG. 8 an elevational view of the nosepiece of FIG. 7 shown in its typical environment.

DETAILED DESCRIPTION OF THE INVENTION

Figure 1:
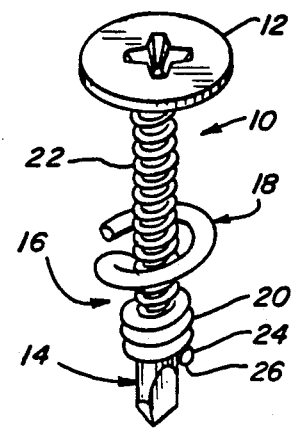
FIG. 1 is a perspective view of a fastener of the present invention.
Figure 2:
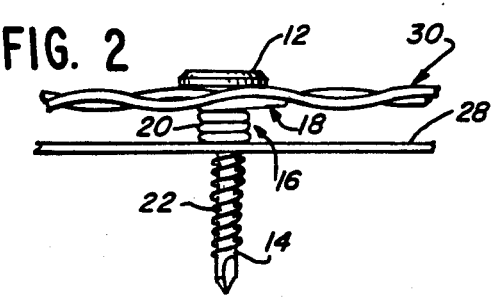
FIG. 2 is an elevational view of the fastener of the present invention showing it in a typical environment.
Figure 3:
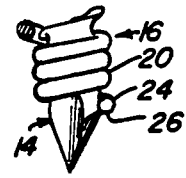
FIG. 3 is an elevational view of the tip of a fastener of the present invention.

Referring now to the drawings in which the same numerals are used for similar parts throughout the various figures, FIGS. 1, 2 and 3 show a screw 10 with a head 12 and a drill tip 14. A spacing element 16 is preassembled to the screw 10 at a location on the shank of the screw adjacent the tip 14. The spacing element 16 includes an enlarged upper portion 18 and a smaller lower portion 20. The lower portion 20 is preferably at least in partial engagement with threads 22 on the screw 10. The spacing element 16 is comprised of a coil made from round wire. The lower end 24 includes a sharp edge 26 which is adapted to engage a metal support 28.

FIG. 2 shows the fastener of the present invention in an installed position. Lath 30 is held away from the metal support 28. The drill tip 14 of the screw 10 is adapted to form a hole in the support 28. During the several revolutions required to form the hole in the support, the spacing element 16 threadingly engages and penetrates the lath 30. The edge 26 of the lower end 24 of the spacing element 16 engages the metal support 28 and prevents the penetration of the spacing element 16 into the support 28. When the screw 10 begins to penetrate and threadingly advance through the support 28, engagement between the edge 26 and the support 28 causes the spacing element to stop its rotation. Continued axial advancement of the screw 10 through the spacing element 16 and the support 28 eventually causes the lath 30 to be clamped between the spacing element 16 and the head 12 of the screw.

It should be noted that in the preferred embodiment, the spacing element is in moderately tight engagement with the lower portion of the screw. This moderately tight or gripping engagement allows rotation of the head 12 of the screw to be transferred to the spacing element 16 as drilling takes place. Once drilling is completed and threaded engagement between the threads 22 and the support 28 begins to take place, abutment between the end 24 of the spacing element 16 and the support 28 causes a slight release of the gripping action between the spacing element and the screw. The release of the engagement between the spacing element 16 and the screw 10 allows the axial advancement of the screw through the spacing element 16 and into the support 28. The sharp edge 26 is specifically adapted to engage a metallic support 28.

Figure 4:
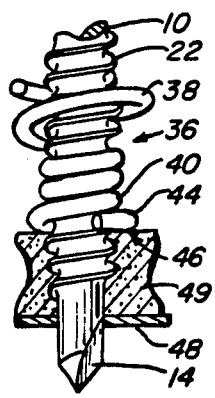
FIG. 4 is an elevational view of an alternative embodiment of a fastener of the present invention.
Figure 5:
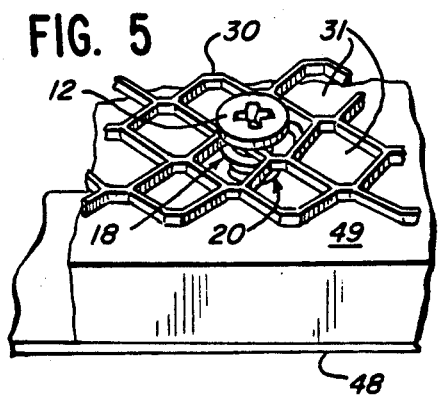
FIG. 5 is a perspective view of the fastener shown in FIG. 4 in its typical environment.

FIGS. 4 and 5 show a slightly modified version of the preferred embodiment. The embodiment of FIGS. 4 and 5 is specifically adapted for use with wall construction in which a non-metallic surface member 49, such as drywall or particle board, has been previously attached to a metal support 48. FIG. 4 shows a coil spacing element 36 with an enlarged upper portion 38 and a smaller lower portion 40. The lower end 44 of the spacing element 36 is slightly enlarged and bent to provide a blunt abutment 46. By providing a blunt abutment 46 at the lower end of the spacing element 36, penetration of the spacing element into the member 49 is prevented. The operation of the fastener shown in FIGS. 4 and 5 is similar to that shown in FIGS. 1 through 3. The spacing element 36 is firmly preassembled to the lower threaded portion of a screw 10. As the tip 14 of the screw 10 is placed against the member 49 and rotated, the helical spacing element 36 threadingly engages the lath 30. The abutment 46 at the lower end of the spacing element 36 prevents the penetration of the spacing element into the member 49. The spacing element 36 is thereby lodged between the lath and the support. The screw 10 axially advances through the spacing element 36, through the member 49 and through the support 48, and the lath 30 is clamped between the upper portion 38 of the spacing element 36 and the head 12 of the screw 10.

In the preferred embodiment of the present invention, shown in FIGS. 1 through 5, it should be noted that the coil spacing element is generally in the form of a tapering helix. The number of turns at the lower portion of the spacing element may be varied. It is desirable, however, that the spacing element be capable of preassembly with a screw. The number of turns of the coil which are in registration with the threads of the screw, as well as the height and lateral extent of the enlarged upper portion of the spacing element will depend upon the type of lath being fastened. Smaller gauge lath may require that the expanded upper portion of the spacing element extend to a point near the lower portion of the spacing element in order to assure threading engagement between the spacing element and the lath. Similarly, the lateral size of the upper portion of the spacing element will depend upon the size of the openings in the lath. The lateral size of the spacing element is preferably at least as large if not larger than the openings 31 in the lath 30. This is necessary to ensure that the lath will be held by the spacing element away from the support.

Figure 6:
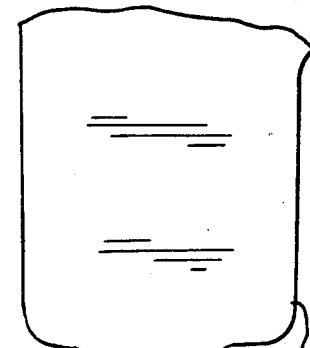
FIG. 6 is an elevational view of another embodiment of the present invention.

FIG. 6 shows an alternative embodiment of the present invention. A generally solid spacing element 56 is shown adjacent to the head 12 of the screw 10. In this embodiment, the spacing element 56 may be integrally formed adjacent the head 12, or it may be a separate element having a through bore. It should be noted, however, that both the pitch and the diameter of the spacing element 56 are substantially larger than the pitch and diameter, respectively, of the screw 10. In order to assure that the lath is maintained at a distance from its support, the pitch of the spacing element 56 is preferably twice that of the screw threads. The spacing element 56 includes a lower end 58 which is smaller in diameter than the upper portion 60. The lower portion 58 includes a shoulder 62 which forms an abutment adapted to engage the surface of a support. The spacing element 56 also includes an annular groove 64 at the upper portion thereof adapted to receive portions of the lath. As with the coil-type spacing element, it may be desirable to preassemble the spacing element 56 at the tip of the screw 10.

FIGS. 7 and 8 show a nosepiece designed to cooperate with the above described embodiments of the present invention. The nosepiece 80 is comprised of a threaded collar 81 adapted to threadingly engage a driving tool 90. The nosepiece also includes two telescoping tubular elements 83 and 84. A coil spring 85 within the upper tubular element 83 urges the lower element 84 into an extended position. Prongs 86 are rigidly fixed to the free end of the lower element 84. The prongs 86 are adapted to penetrate openings 31 in the lath 30 and abut the support 48. A torque transmitting bit 91 associated with the tool 90 engages a recess in the head 12 of the screw 10. As the screw is advanced through the spacing element 36 and into the support 48, the tubular elements 83 and 84 telescopically collapse. The telescoping movement of the elements 83 and 84 is limited, however, so that axial movement of the bit 91 is limited. At a predetermined axial position, the screw 10 will disengage from the bit 91 and further rotation of the screw will stop. The prongs 86 and the lower element 84 therefore define a torque-limiting recess 87 which prevents the application of excessive compressive force upon the spacing element 36. By limiting the axial movement of the bit 91, and therefore the head 12, the lath 30 is maintained at a predetermined distance from the support 48.

It is clear that alternative methods of limiting the axial penetration of the screw 10 are available. Examples include forming a shoulder on the shank of the screw at a predetermined distance from the head to prevent penetration of the screw into the support. It is also clear that many changes and modifications in the above described embodiments of the invention will occur to those skilled in the art. Accordingly, it is intended that such changes, modifications and variations be encompassed within the spirit and scope of the appended claims.

We claim:

1. A fastener for spacingly attaching a sheet to a support comprising: a screw having a shank with at least one thread thereon and an enlarged head at one end and a drill tip at the other, a coil member initially disposed adjacent said tip, said coil having a lower portion in registration with threads on said screw near said tip, and an upper portion defining a diameter substantially larger than the diameter of said shank, said upper portion having a pitch substantially greater than that of said lower portion and said threads, said member being firmly mounted near said tip whereby rotation of said screw causes said member to pass threadingly through said sheet whereby, upon engagement of said support by said member, rotation of said member stops and rotation of said screw causes said screw to pass through said member and clampingly engage said lath between said screw and said upper portion.

2. A fastener in accordance with claim 1 wherein said lower portion has a sharp edge adapted to engage a metal support.

3. A fastener in accordance with claim 1 wherein said lower portion has means at the end thereof to prevent penetration of said coil member into a support of non-metallic material.

4. A fastener in acordance with claim 3 wherein said means includes at least a partial turn of said coil having an enlarged radial extent and a turned-in end of said coil member adjacent thereto.

5. In combination, a screw and a spacing element; said screw comprising shank with at least one thread and a head at one end and a drill tip at the other; said spacing element comprising a coil member having a lower end with at least approximately one turn which generally corresponds in inner diameter to a root diameter of said shank, and an upper end forming an outwardly and upwardly tapering continuation of said lower end and defining a spiralling helix which increases in size to a second diameter substantially larger than that of said lower portion.

* * * * *